(12) United States Patent
Chung et al.

(10) Patent No.: US 9,218,052 B2
(45) Date of Patent: Dec. 22, 2015

(54) FRAMEWORK FOR VOICE CONTROLLING APPLICATIONS

(71) Applicant: SAMSUNG ELECTRONICS CO., LTD., Suwon, Gyeonggi-Do (KR)

(72) Inventors: Ho Suk Chung, Rancho Palos Verdes, CA (US); Ainsley Chong, Monterey Park, CA (US); Nikun Khoongumjorn, Irvine, CA (US); Duncan Lung-Sing Wong, Alhambra, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 13/831,113

(22) Filed: Mar. 14, 2013

(65) Prior Publication Data

US 2014/0278440 A1  Sep. 18, 2014

(51) Int. Cl.

| | | |
|---|---|---|
| *G10L 21/00* | (2013.01) | |
| *G06F 3/01* | (2006.01) | |
| *G06F 3/16* | (2006.01) | |
| *G06F 3/0482* | (2013.01) | |
| *G10L 15/26* | (2006.01) | |
| *G10L 15/22* | (2006.01) | |

(52) U.S. Cl.
CPC ............ *G06F 3/01* (2013.01); *G06F 3/0482* (2013.01); *G06F 3/167* (2013.01); *G10L 15/26* (2013.01); *G10L 2015/223* (2013.01)

(58) Field of Classification Search
CPC ....... G10L 15/22; G10L 15/26; G10L 15/265; G10L 2015/223; G10L 13/00; G10L 15/005; G10L 15/00; G10L 17/005; G10L 2015/228; G10L 15/20; G10L 25/48; G06F 3/167
USPC .............. 704/1–10, 250, 251, 255, 257, 275, 704/270, 235, 272, 278; 709/217; 248/563
See application file for complete search history.

(56) References Cited

U.S. PATENT DOCUMENTS

| | | | |
|---|---|---|---|
| 6,584,439 B1 * | 6/2003 | Geilhufe et al. | 704/270 |
| 7,146,323 B2 | 12/2006 | Guenther et al. | |
| 7,418,382 B1 | 8/2008 | Maes | |
| 7,940,338 B2 | 5/2011 | Lin et al. | |
| 2003/0078784 A1 * | 4/2003 | Jordan et al. | 704/275 |
| 2003/0174248 A1 * | 9/2003 | Maruyama | 348/563 |
| 2006/0075429 A1 | 4/2006 | Istvan et al. | |
| 2008/0059195 A1 * | 3/2008 | Brown | 704/270 |
| 2012/0311070 A1 * | 12/2012 | BianRosa et al. | 709/217 |

* cited by examiner

*Primary Examiner* — Huyen Vo
(74) *Attorney, Agent, or Firm* — Sherman IP LLP; Kenneth L. Sherman; Steven Laut

(57) ABSTRACT

A system for voice control of applications includes an electronic device that receives speech signals and converts the speech signals into words. A voice navigation module analyzes an application and determines application type and enabled features. A command registration module registers commands based on the determined application type and enabled features. The commands control the application when matched with associated speech. A speech command interpretation module receives the words and detects a speech mode for matching commands with interpreted speech, and executes matched commands for navigating through and controlling the application.

30 Claims, 11 Drawing Sheets

| Set Name | Command | Callback | Type | Notes |
|---|---|---|---|---|
| RemoteControl | Up | navigate("up") | static | |
| | Down | navigate("down") | static | |
| | Left | navigate("left") | static | |
| | Right | navigate("right") | static | |
| | Play | player.play() | static | |
| | Stop | player.stop() | static | |
| Menu | Popular | menuItem("Popular") | static | |
| | Favorites | menuItem("Favorites") | static | |
| | Movies | menuItem("Movies") | static | |
| | TV | menuItem("TV") | static | |
| Content | Toy Story 3 | select("Toy Story 3") | static | |
| | Batman Begins | select("Batman Begins") | static | |
| | Avatar | select("Avatar") | static | |
| | Star Wars | select("Star Wars") | static | |
| FreeSpeech | ".*? comedy.*" | performSearch ("comedy") | dynamic | Match sentence with "comedy" |
| | "search [content]" | performSearch(content) | dynamic | Search on spoken content variable |
| | "Play [title]" | player.play(title) | dynamic | Play selected title |
| | ".*? page [index]" | selectPage(index) | dynamic | Scroll to the page index |

FIG. 9

| Regex Command | Sample Matches |
|---|---|
| ".*? comedy.*" | "I'd like to watch a comedy." |
| South lyon | "Comedy?" |
| | "Comedy please." |
| "search [content]" | "Search for Batman movies." |
| | "Search for cat videos." |
| | "Search Toy Story 3" |
| "Play [title]" | "Play Batman Begins" |
| | "Play Toy Story 3" |
| ".*? page [index]" | "Go to page 4." |
| | "Page 3." |

FIG. 10

|  | 1110 | 1220 | 1230 | 1200 |
|---|---|---|---|---|
|  | Input String | Phonetic String | Matching Strings | |
| 1250 | "Ally McBeal" | ALMKPL | Alley McBeal | |
|  |  |  | Ally Mcbell | |
|  |  |  | Allie McBeal | |
|  |  |  | Aly McBeal | |
| 1260 | "Southland" | SOLNT | South land | |
|  |  |  | South lyon | |
|  |  |  | Southlands | |
| 1270 | "Columbiana" | KLMPN | colombe ana | |
|  |  |  | Colombiana | |
|  |  |  | Columbia | |
FIG. 11
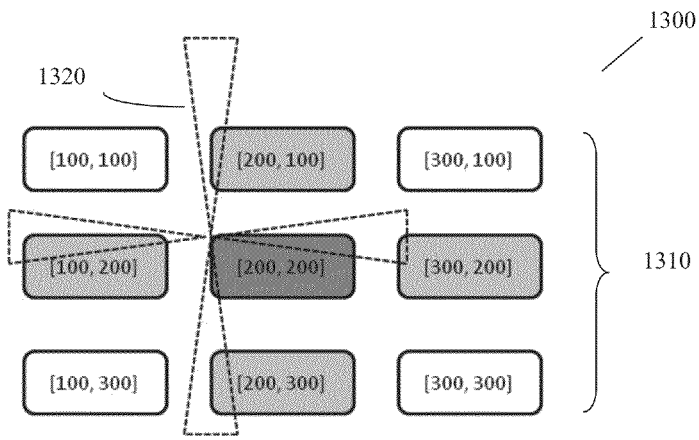
FIG. 12
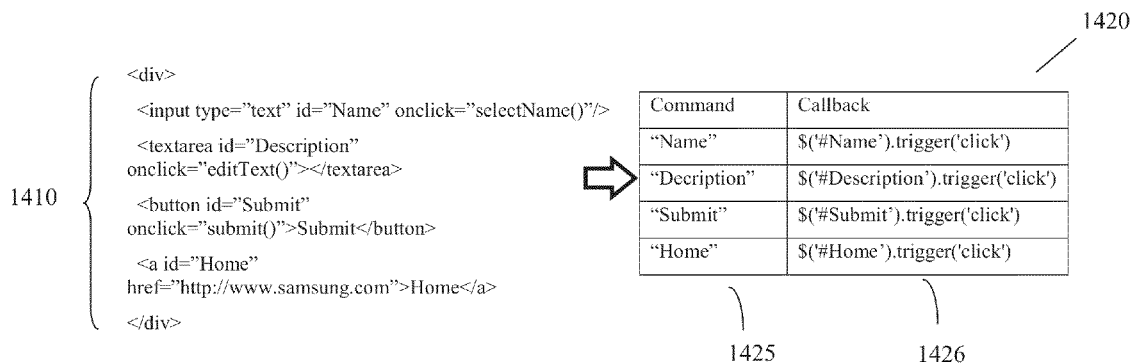
FIG. 13

FRAMEWORK FOR VOICE CONTROLLING APPLICATIONS

TECHNICAL FIELD

One or more embodiments relate generally to applications, and in particular, to a navigation framework for voice control of applications on an electronic device.

BACKGROUND

Television applications may be developed using standard web technologies, such as hypertext mark-up language (HTML), JavaScript and Flash. Utility of these web-based television applications are usually limited to using a remote control device with directional step-by-step inputs (i.e., up, down, left, right) and click type selection that is navigated using directional inputs.

SUMMARY

In one embodiment, a system provides for voice control of applications. One embodiment comprises a system that includes an electronic device that receives speech signals and converts the speech signals into words. In one embodiment a voice navigation module analyzes an application and determines application type and enabled features. In one embodiment a command registration module registers commands based on the determined application type and enabled features. The commands control the application when matched with associated speech. In one embodiment a speech command interpretation module receives the words and detects a speech mode for matching commands with interpreted speech, and executes matched commands for navigating through and controlling the application.

One embodiment provides a method for voice control of applications. In one embodiment the method comprises analyzing an application for detecting application type and enabled features. In one embodiment commands based on the detected application type and enabled features are registered. The commands control the application when matched with associated speech. In one embodiment, words converted from speech are received and a speech mode for matching commands with interpreted speech is detected. Matched commands for navigating through and controlling the application are executed.

Another embodiment provides a non-transitory computer-readable medium having instructions which when executed on a computer perform a method comprising: analyzing an application for detecting application type and enabled features. In one embodiment, commands are registered based on the detected application type and enabled features. The commands control the application when matched with associated speech. In one embodiment words converted from speech are received and a speech mode for matching commands with interpreted speech is detected. Matched commands for navigating through and controlling the application are executed.

These and other aspects and advantages of the one or more embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9 shows an example multi-dimensional data structure for command pairs organized into sets for a navigation framework for voice controlling applications on an electronic device, according to an embodiment.

FIG. 10 shows an example table of Regex matching for a navigation framework for voice controlling applications on an electronic device, according to an embodiment.

FIG. 11 shows an example table of phonetic matching for a navigation framework for voice controlling applications on an electronic device, according to an embodiment.

FIG. 12 shows an example showing remote control emulation for a navigation framework for voice controlling applications on an electronic device, according to an embodiment.

FIG. 13 shows an example showing automated command registration via document object model (DOM) analysis for a navigation framework for voice controlling applications on an electronic device, according to an embodiment.

DETAILED DESCRIPTION

Figure 1:
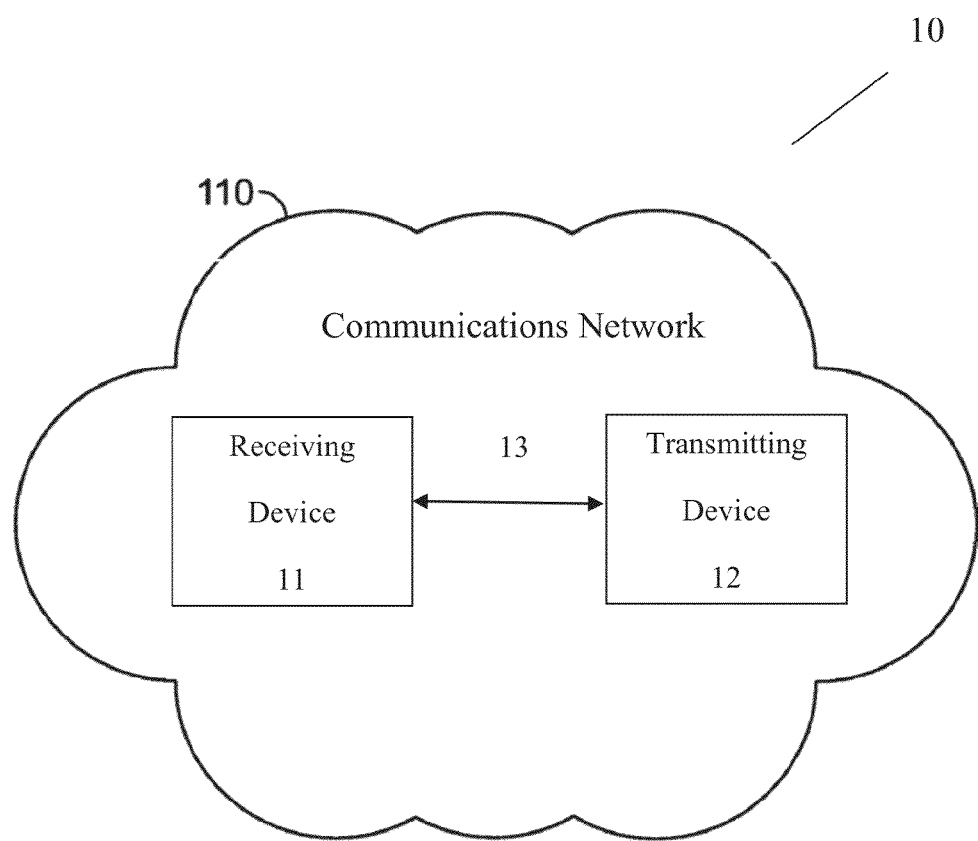
FIG. 1 shows a schematic view of a communications system, according to an embodiment.

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally voice control of applications (e.g., web applications), which may be used with an electronic device (e.g., a television device). In one embodiment, a voice navigation module analyzes an application and determines application type and enabled features. In one embodiment a command registration module registers commands based on the determined application type and enabled features. The commands control the application when matched with associated speech. In one embodiment a speech command interpretation module receives the words and detects a speech mode for matching commands with interpreted speech, and executes matched commands for navigating through and controlling the application.

In one embodiment, the electronic device comprises an electronic device capable of data communication over a communication link such as a wireless communication link. Examples of such an electronic device include stationary electronic devices, a mobile phone device, a mobile tablet device, etc. Examples of a stationary electronic device may include televisions, projector systems, etc. In one embodiment, a method provides for voice control of applications for an electronic device. One embodiment comprises analyzing an application for detecting application type and enabled features. In one embodiment commands based on the detected application type and enabled features are registered. The commands control the application when matched with associated speech. In one embodiment, words converted from speech are received and a speech mode for matching commands with interpreted speech is detected. Matched commands for navigating through and controlling the application are executed.

Web applications assume that any object on screen may be clicked at any time and it is well suited for "click" type controls, such as voice and gesture. Thus, Web application style development is not well suited for directional controls since there is no concept of coordinates between different buttons. Applications on televisions are typically developed in a "remote control style" (e.g., linear movements) instead of a "web application style," making them difficult to convert for complex voice/gesture navigation.

In one embodiment, a television side (e.g., client-side) framework uses voice recognition technology to navigate web applications on a television electronic device. In one embodiment, the framework comprises of a core library as well as modules that account for specific technologies (e.g., Flash) and specific features (e.g., remote control emulation). In one embodiment, the framework provides for web type applications (e.g., hypertext markup language (HTML)/JavaScript (JS), Flash/Air, etc.) to traverse multiple objects or search an object with a single recognition command. In one embodiment, developer effort is minimized in using the framework to provide for voice control for commands and navigation. In one embodiment, features are included in the framework, such as conditional dependency injection, automatic command registration and smart defaults for assisting developers.

In one embodiment, applications are designed for remote-control style controls are provided with voice remote controls with the addition of a few extra lines of code. In one embodiment, for applications that are a hybrid between remote and cursor styles for control, the framework provides for registering clickable objects (e.g., on screen objects) with voice commands. In one embodiment, for applications that fully use cursor+event handler style of control, the framework provides full voice and gesture control with minimum modification to existing application code.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a television system, a device with audio video capabilities, tablets, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
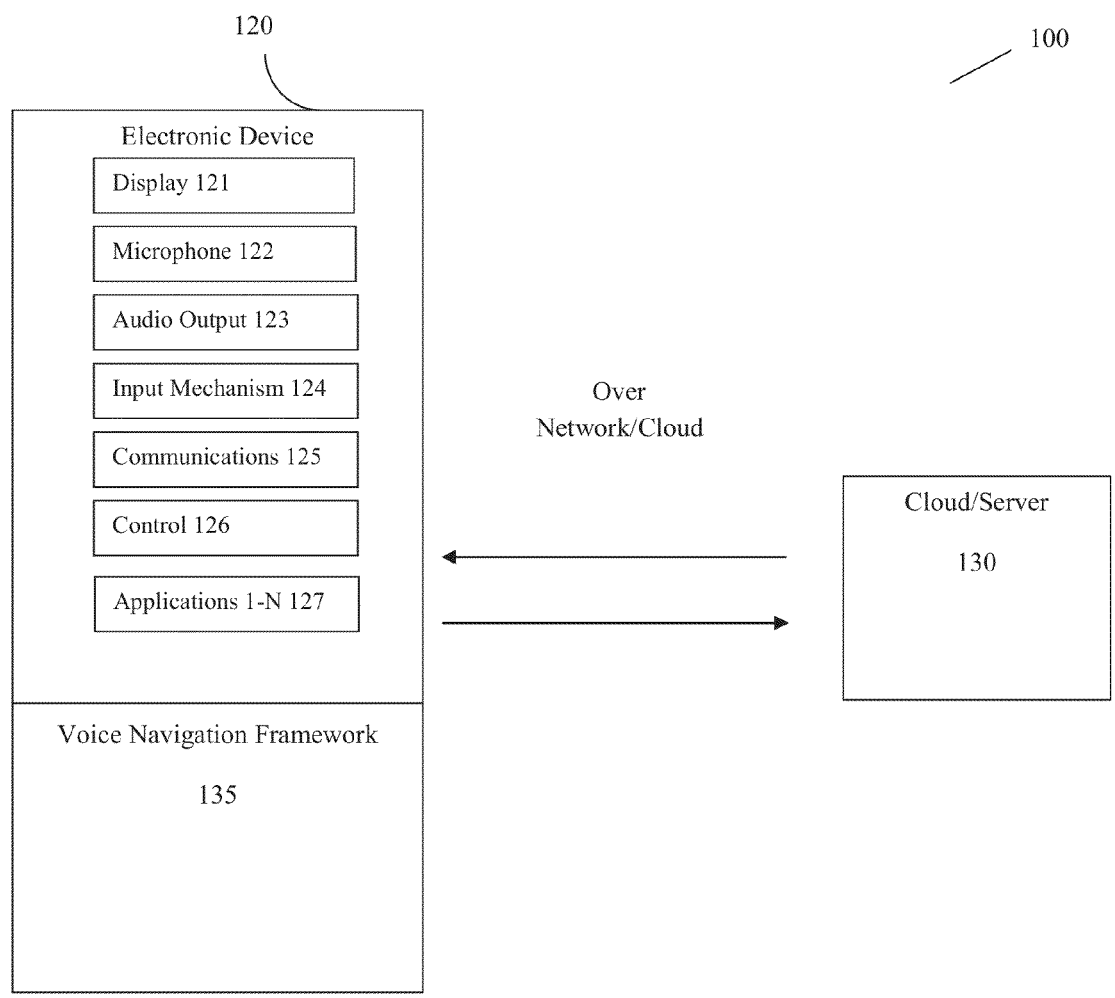
FIG. 2 shows a block diagram of an architecture system for a navigation framework for voice controlling applications on an electronic device, according to an embodiment.

FIG. 2 shows a functional block diagram of an architecture system 100 that may be used for voice control of applications for an electronic device 120, according to an embodiment. Both transmitting device 12 and receiving device 11 may include some or all of the features of electronics device 120. In one embodiment, the electronic device 120 may comprise a display 121, a microphone 122, audio output 123, input mechanism 124, communications circuitry 125, control circuitry 126, a voice navigational framework module 135, and any other suitable components. In one embodiment, applications 1-N 127 are provided by providers (e.g., third-party providers, developers, etc.) and may be obtained from the cloud or server 130, communications network 110, etc., where N is a positive integer equal to or greater than 1.

In one embodiment, all of the applications employed by audio output 123, display 121, input mechanism 124, communications circuitry 125 and microphone 122 may be interconnected and managed by control circuitry 126. In one example, a hand held music player capable of transmitting music to other tuning devices may be incorporated into the electronics device 120.

In one embodiment, audio output 123 may include any suitable audio component for providing audio to the user of electronics device 120. For example, audio output 123 may include one or more speakers (e.g., mono or stereo speakers) built into electronics device 120. In some embodiments, audio output 123 may include an audio component that is remotely coupled to electronics device 120. For example, audio output 123 may include a headset, headphones or earbuds that may be coupled to communications device with a wire (e.g., coupled to electronics device 120 with a jack) or wirelessly (e.g., Bluetooth® headphones or a Bluetooth® headset).

In one embodiment, display 121 may include any suitable screen or projection system for providing a display visible to the user. For example, display 121 may include a screen (e.g., an LCD screen) that is incorporated in electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app). In some embodiments, the electronics device 120 may include one or several applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include microphone 122. For example, electronics device 120 may include microphone 122 to allow the user to transmit audio (e.g., voice audio) for speech control and navigation of applications 1-N 127, during a communications operation or as a means of establishing a communications operation or as an alternate to using a physical user interface. Microphone 122 may be incorporated in electronics device 120, or may be remotely coupled to the electronics device 120. For example, microphone 122 may be incorporated in wired headphones, microphone 122 may be incorporated in a wireless headset, may be incorporated in a remote control device, etc.

In one embodiment, the electronics device 120 may include any other component suitable for performing a communications operation. For example, the electronics device 120 may include a power supply, ports or interfaces for coupling to a host device, a secondary input mechanism (e.g., an ON/OFF switch), or any other suitable component.

In one embodiment, the voice navigational framework module 135 provides voice command control for applications that do not include any means for voice control of the applications. In one embodiment, for applications that are designed for remote-control style control (e.g., single input presses, navigation in step by step moves, such as up, down, left, right), the voice navigational framework module 135 provides voice command control of the remote controls. In one embodiment, for a Javascript library, the voice navigational framework module 135 generates events that map voice commands to remote control commands. In another embodiment, the voice navigational framework module 135 modifies firmware to allow all applications to enable basic voice controls with a parameter in a file, such as the config.xml file.

In one embodiment, for applications that are a hybrid between remote control and cursor style controllable (e.g., move and click), the voice navigational framework module 135 provides a framework to register clickable objects on screen. In one embodiment, the mechanism for voice/gesture acts in a way such that when an object would typically be "clicked" in an application, a function( ) is called to handle it. In one embodiment, the voice navigational framework module 135 provides a single library for a developer to register all the clickable objects on screen. In one embodiment, the library may provide the implementations for voice, gesture, and remote (e.g. Voice-Navi lib for HTML/JS and Voice-Navi lib for Flash/Air). In some embodiments, an application (e.g., web application for TV) developer does not need to be concerned with multi-modal control as they may provide application code once and all designed physical controls will work automatically.

In one embodiment, the voice navigational framework module 135 provides additional features on top of an existing software development kit (SDK)—allowing developers to work with sets of commands, visually cycle through the list of possible commands, and disambiguation of multiple commands. In one embodiment, for applications that are designed to fully use cursor+event handler styles of controls, the voice navigational framework module 135 provides full voice and gesture control with minimum modification to existing application code. In one embodiment, instead of requiring developers to register their callbacks, the voice navigational framework module 135 provides for analyzing the DOM to automatically register callbacks. In one embodiment, the voice navigational framework module 135 provides an advantage that developers are free to develop innovative voice navigation solutions for their web applications.

The voice navigational framework module 135 provides a framework that has a powerful feature set, is easy to learn, and should encourage developers to adopt it. In one embodiment, the voice navigational framework module 135 provides for allowing developers to decide what level of voice navigation is appropriate for their TV application, and depending on the level chosen, the application may require very little modification or significant modification. In one example, for remote control emulation only, the existing application may only require a one-line addition of a voice-navigation library, without any other changes to the existing code (e.g., voice enabled Pandora, Vudu, NHL apps, etc.). In one embodiment, the voice navigational framework module 135 allows developers to register desired voice commands to the voice-navigation library (e.g., voice-enabled Comcast Xfinity app).

Figure 3:
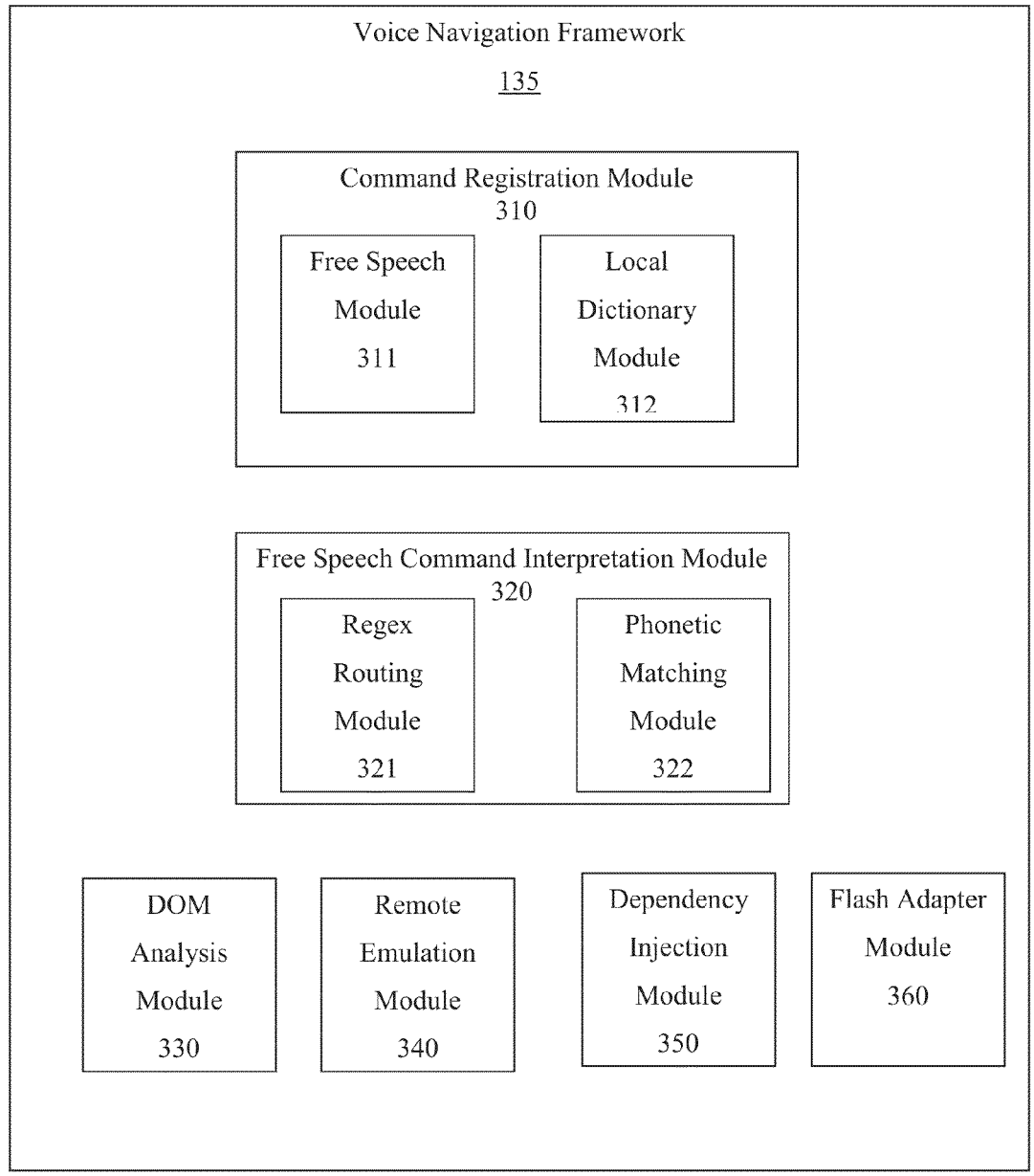
FIG. 3 shows a navigation framework module for voice controlling applications on an electronic device, according to an embodiment.

FIG. 3 shows the navigation framework module 135 for voice controlling applications on an electronic device (e.g., electronic device 120, FIG. 1), according to an embodiment. In one embodiment, the navigation framework module 135 comprises a command registration module 310, a free speech command interpretation module 320, a DOM analysis module 330, a remote emulation module 340, a dependency injection module 350 and a flash adapter module 360. In one embodiment, the command registration module 310 comprises a free speech module 311 and a local dictionary module 312. In one embodiment, the free speech command interpretation module 320 comprises a Regex (regular expression) routing module 321 and a phonetic matching module 322.

Figure 4:
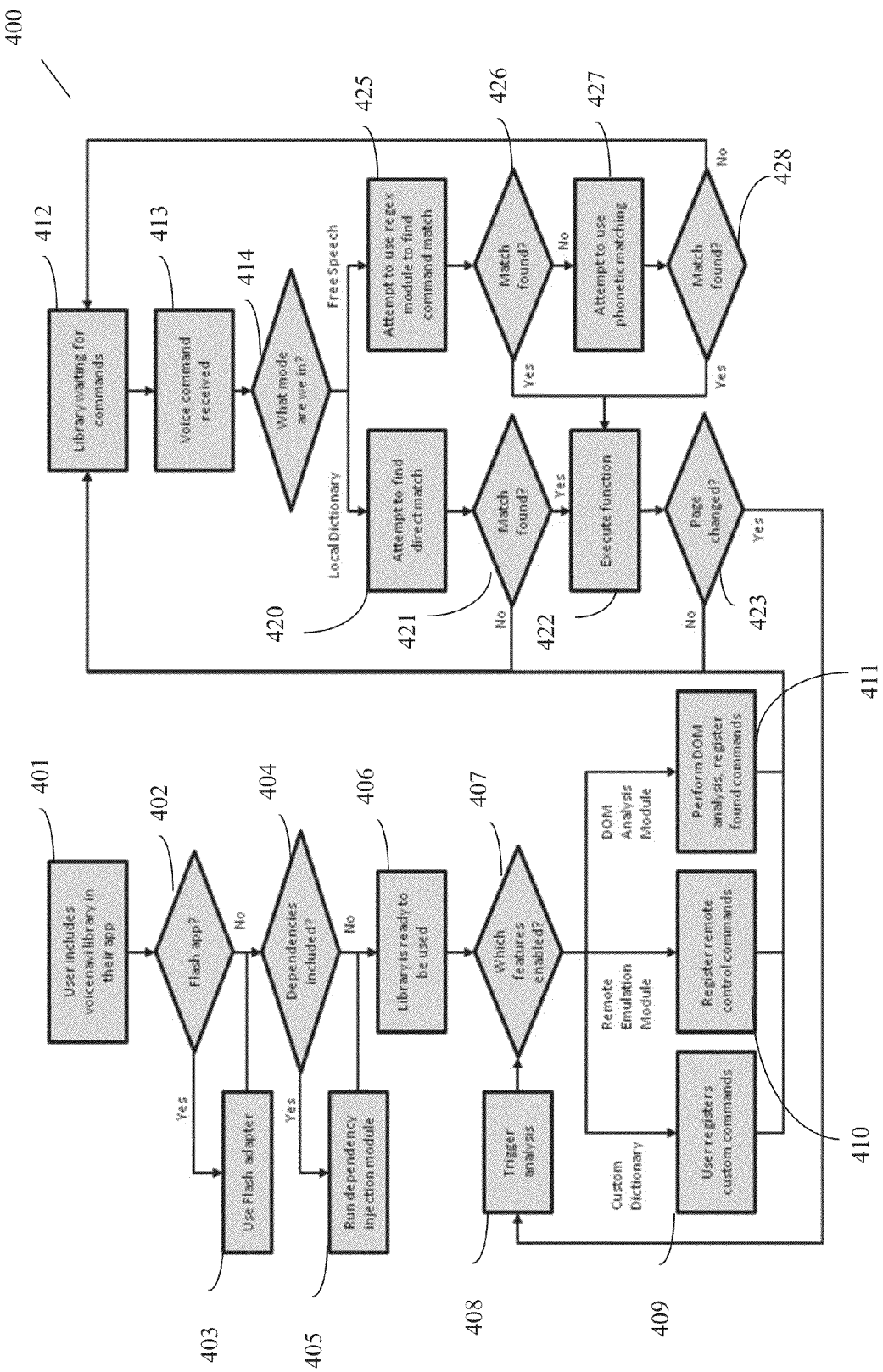
FIG. 4 shows an example flow chart for a navigation framework for voice controlling applications on an electronic device, according to an embodiment.

FIG. 4 shows an example flow chart 400 for showing how the modules of the navigation framework module 135 are used in relation to one another, according to an embodiment. In one embodiment, in block 401 a user/developer includes a voice and navigation library (e.g., voicenavi library) in an application (e.g., a web application for TV). In block 402, the navigation framework module 135 determines whether the application is a Flash type of application. If it is determined in block 402 that the application is a Flash type of application, the flow chart 400 continues to block 403 where the flash adapter module 360 is used for makes the framework accessible to actionscript developers as an actionscript library. In one embodiment, after making a single line actionscript call, the flash adapter module 360 injects the framework for voice control of the application through the ExternalInterface application programming interface (API) provided by a flash player. In one embodiment, the flash adapter module injects additional javascript that searches for the flash object in an application web page and registers the corresponding actionscript callbacks in the voice-navigation library.

In one embodiment, if block 402 determines that the application is not a Flash application, the flowchart continues to block 404 where the navigation framework module 135 determines whether the application includes any dependencies (e.g., device specific dependencies). In one embodiment, if it is determined that the application does include dependencies, the flowchart 400 continues to block 405 where the dependency injection module 350 is executed. In one embodiment, the dependency injection module 350 injects the framework's required software dependencies into the developer code of the application. In one embodiment, the injected dependencies include device-specific dependencies, allowing the same framework to be used across a variety of electronic devices (e.g., different types of TV systems, devices, components, etc.). In one embodiment, upon the dependency injection module 350 including the framework in the application, a self-executing function checks for existing libraries and creates local copies for itself if they have not yet been included. In one embodiment, once the injection into the application is completed by the dependency injection module 350, the self-executing function begins initialization of whichever application modules the developer has chosen without further intervention. If block 404 determines that dependencies are not included in the application, the flowchart 400 continues to block 406 where the voice-navigation library is ready to be used.

In block 407, the navigation framework module 135 determines the features that are enabled in the application (including the voice-navigation library). In one embodiment, for custom commands desired by a developer in the application, in block 409 the command registration module 310 adds the custom commands into a custom command dictionary. In one embodiment, for remote control commands in the application, in block 410 the command registration module 310 registers the remote control command/callback pairs into a multi-dimensional data structure 1000 (FIG. 9). In one embodiment, new command/callback pairs may be dynamically added to the multi-dimensional data structure 1000 as a user interface (UI) shifts between different scenes of the application. In one embodiment, command pairs are organized into sets, where the sets represent logical partitions of the UI, such as menu items and content icons. In one embodiment, the command pairs represent sets of abstract commands, such as remote control inputs. In one embodiment, the sets may be enabled and disabled by a developer as desired for user navigation through the UI.

In one embodiment, for cursor/gesture commands in the application, in block 411 the DOM analysis module 330 performs DOM analysis on the application and analyzes the application for commands and callback functions, and registers found commands and callback functions automatically into the command registration module 310. In one embodiment, a developer may specify HTML attributes that will be searched during the analysis, using a custom attribute, such as "voice" or an existing one such as "ID." In one embodiment, the DOM analysis module 330 searches for the custom attributes using, for example, jQuery, and registers their callbacks into the command registration module 310. The flowchart 400 continues to block 412 upon the completion of the appropriate block 409, 410 or 411.

In one embodiment, in block 412 the library of the application is now ready for receiving commands from a user of the electronic device, e.g., electronic device 120. In one embodiment, the application may be launched by using a voice recognition application on the electronic device using the input mechanism 124 (e.g., speaking a command for launching the application, tapping on a display screen, pressing a button, using a remote control, launching a dialog application, etc. In one embodiment, speech signals entered through a microphone (e.g., microphone 122) are processed by an ASR and input in block 413 for an initial utterance. In block 413 the voice command is received for the application launched on the electronic device. The flowchart 400 then continues to block 414.

In block 414, the navigation framework module 135 determines the type of mode that the received speech comprises. In one embodiment, if it is determined that the mode is for local dictionary only commands, the flowchart continues to block 421 for processing by the local dictionary module 312, otherwise if it is determined that the mode is for free speech commands, the flowchart continues to block 425 for processing by the free speech module 311. In one embodiment, the mode is determined based on matching the speech.

In one embodiment, when the electronic device detects voice input, the voice is translated into a string and passed into the navigation framework module 135. The navigation framework module 135 processes the string for attempting to match the string to a command within the currently active command pair sets. In one embodiment, if the current mode is determined to be local dictionary, only entries with a static type are searched in block 420. If the current mode is determined to be free speech, in block 425 both static and dynamic entries are searched for matching commands.

In one embodiment, for local dictionary mode, block 420 processes the speech input and attempts to match a command using the local dictionary module 312. In block 421, if a match is found the flowchart continues to block 422. If a match is not found in block 421, the flowchart continues to block 412. In one embodiment, in block 422, the matched commands are executed for the application based on the received speech. The flowchart proceeds to block 423 where it is determined whether a page in the application has changed or not. If the navigation framework module 135 detects that a page in the application has changed since last processing the page of the application, the flowchart proceeds back to block 408 for processing, otherwise the flowchart proceeds back to block 412 awaiting further speech commands.

In one embodiment, in block 425, the free speech command interpretation module 320 is used for processing the received speech using the Regex routing module 321 for searching within the free speech module 311. In one embodiment, dynamic type commands use a regular expression syntax to give developers additional flexibility. In one embodiment, dynamic commands are processed by the Regex routing module 321 for matching. In block 426, if a regular expression match is found, the flowchart continues to block 422 for processing. If a match is not found in block 426, the flowchart continues to block 427. In one embodiment, in block 427 the phonetic matching module 322 is used to attempt to match the speech input.

In one embodiment, the phonetic matching module 322 supports the Regex routing module 321 using fuzzy matching. In one embodiment, if no direct match is found for a given vocal command by the Regex routing module 321, a second attempt is made using phonetic matching using the phonetic matching module 322. In one embodiment, phonetic translation processing searches for common linguistic patterns and condenses normal strings into phonetic equivalents. In one embodiment, the phonetic equivalents may then be compared to the phonetic equivalent of user registered commands (e.g., in the free speech module 311). In one embodiment, the navigation framework module 135 uses a well-known algorithm, such as double-metaphone for processing the phonetic translation. In block 428, if a match is found, the flowchart continues to block 422 for processing, otherwise the flowchart continues to block 412 for processing.

Figure 5:
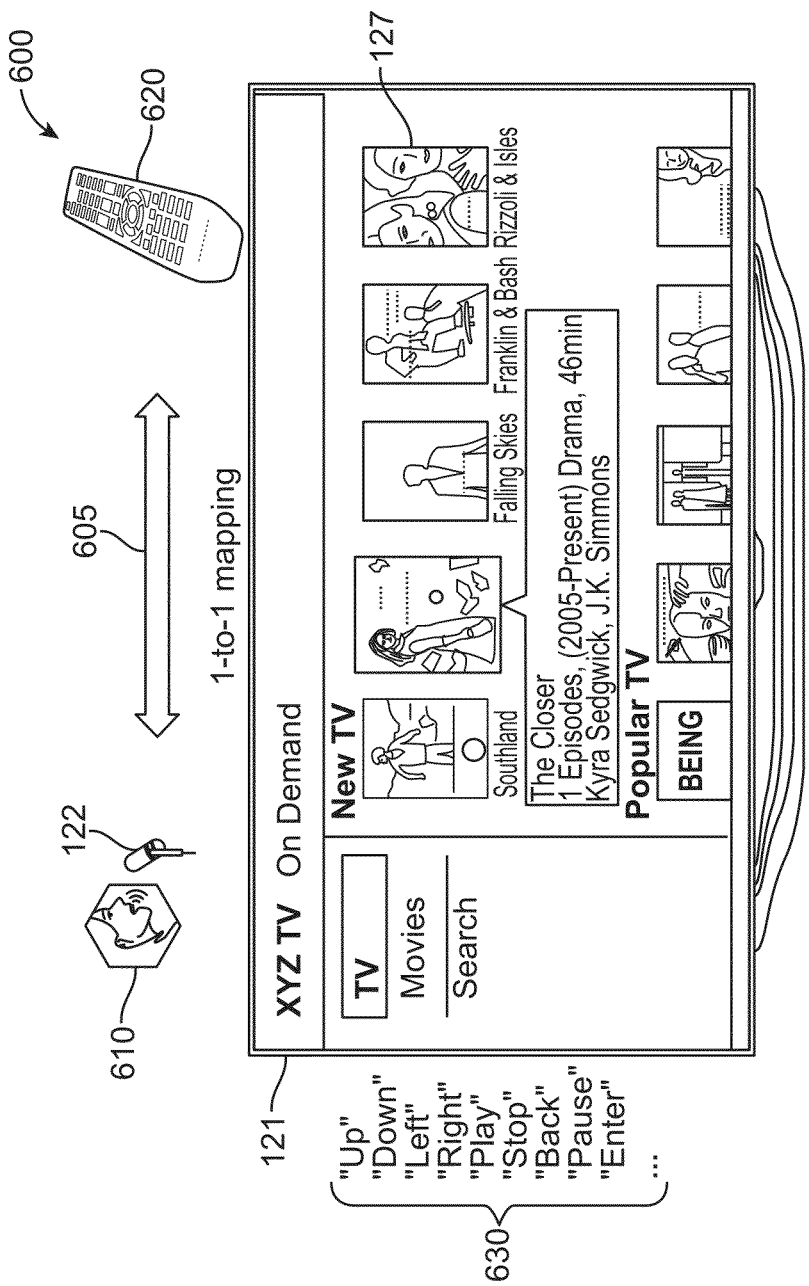
FIG. 5 shows an example scenario for a navigation framework for voice controlling applications on an electronic device, according to an embodiment.

FIG. 5 shows an example scenario 600 for remote control command emulation using a navigation framework for voice controlling applications on an electronic device (e.g., electronic device 120), according to an embodiment. In one embodiment, the speech commands 610 entered into the microphone 122 have a one-to-one mapping 605 to directional controls 630 of a remote control device (e.g., remote control 620). In one embodiment, if the executed application 1-N 127 displayed on display device 121 of the electronic device 120 does not already have directional controls (e.g., directional controls 630) enabled, the navigation framework module 135 provides directional controls via DOM analysis. In one embodiment, once directional controls (e.g., directional controls 630) are enabled, the navigation framework module 135 allows preset voice commands to emulate the remote control buttons. In one embodiment, dependency injection allows this feature to be available to an application with only adding one or two extra lines of code by developers.

Figure 6:
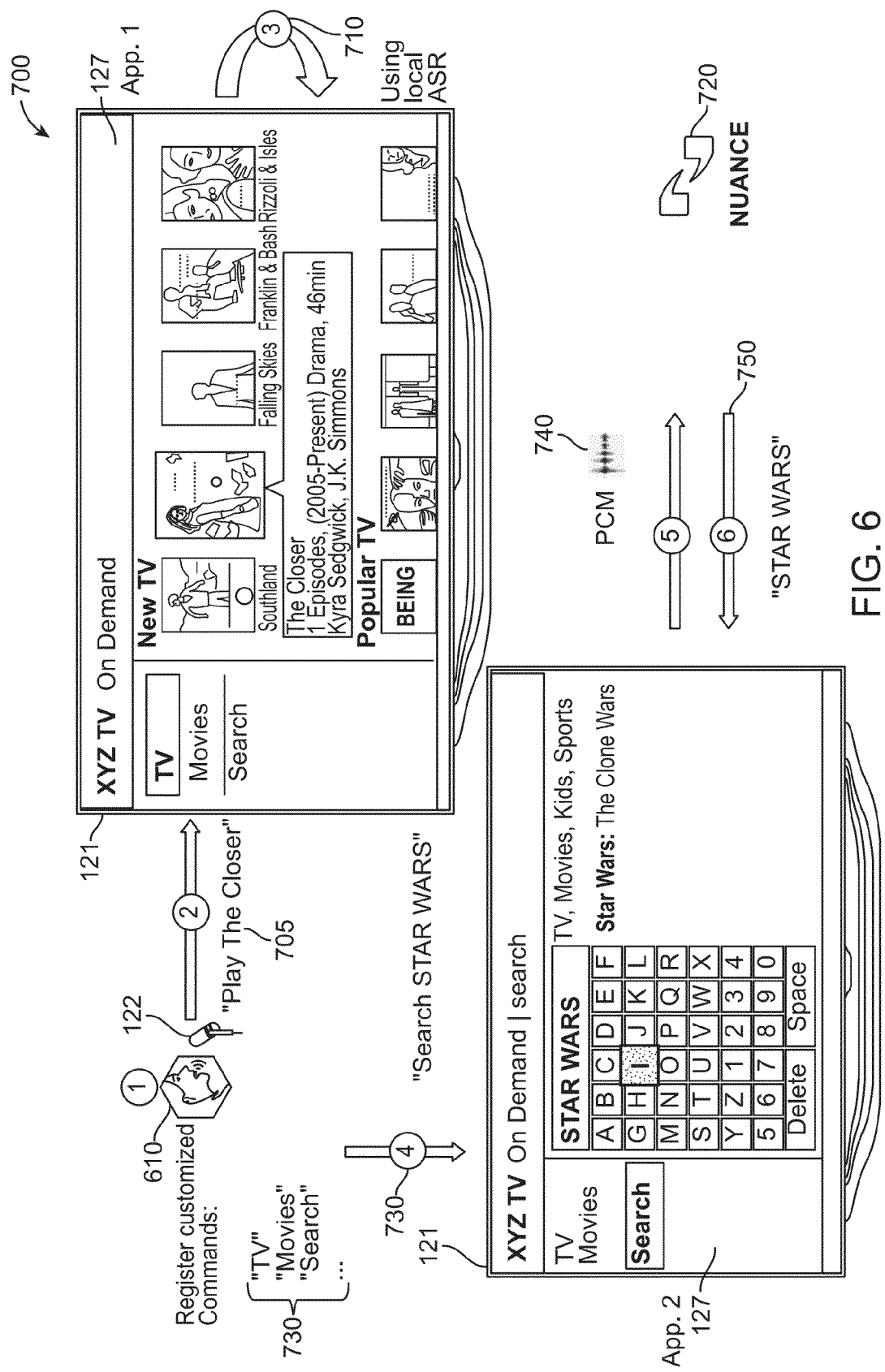
FIG. 6 shows another example scenario for a navigation framework for voice controlling applications on an electronic device, according to an embodiment.

FIG. 6 shows another example scenario 700 for using a navigation framework for voice controlling applications on an electronic device 120, according to an embodiment. In one embodiment, user speech commands 610 are entered using a microphone 122 using registered customized commands, such as example custom commands 730. In one example, the speech contains the words "play the Closer" 705 as the user is viewing the application 1 127 on the display 121. In one embodiment, the navigation framework module 135 uses ASR 710 to convert the words to commands for searching command pairs in order to use the received speech 705 to execute the command.

In one embodiment, the user is using another application 2 127 for entering a string for searching on display 121. In this embodiment, the custom commands 730 are searched as the user has now entered the speech terms "search STAR WARS" 730. In one embodiment, the user speech invokes the application 2 127 using the term "search", which is paired with executing a string search application (i.e., application 2 127). Using the rest of the speech terms "STAR WARS," the navigation framework module 135 uses processing (e.g., pulse code modulation (PCM 740)) and a conversion application (e.g., Nuance 720) to enter the converted text (e.g., "Star Wars" 750) into the application 2 127 for execution. In one embodiment, the navigation framework module 135 uses command registration of the custom commands 730 to allow a developer to directly specify voice command/function callback pairs, which requires more development effort than, for example, remote control emulation, but also provides the most flexibility to define unique behaviors from voice commands outside of those that may be automatically extracted. In one embodiment, automatic command registration is used by the navigation framework module 135 for analyzing a web application to identify selectable HTML objects and register them into the voice-navigation dictionary. In one embodiment, as the application refreshes with new pages, the navigation framework module 135 will automatically update the voice-navigation dictionary with new selectable objects. In one embodiment, automatic command registration enables title navigation with minimal code changes required by a developer.

Figure 7:
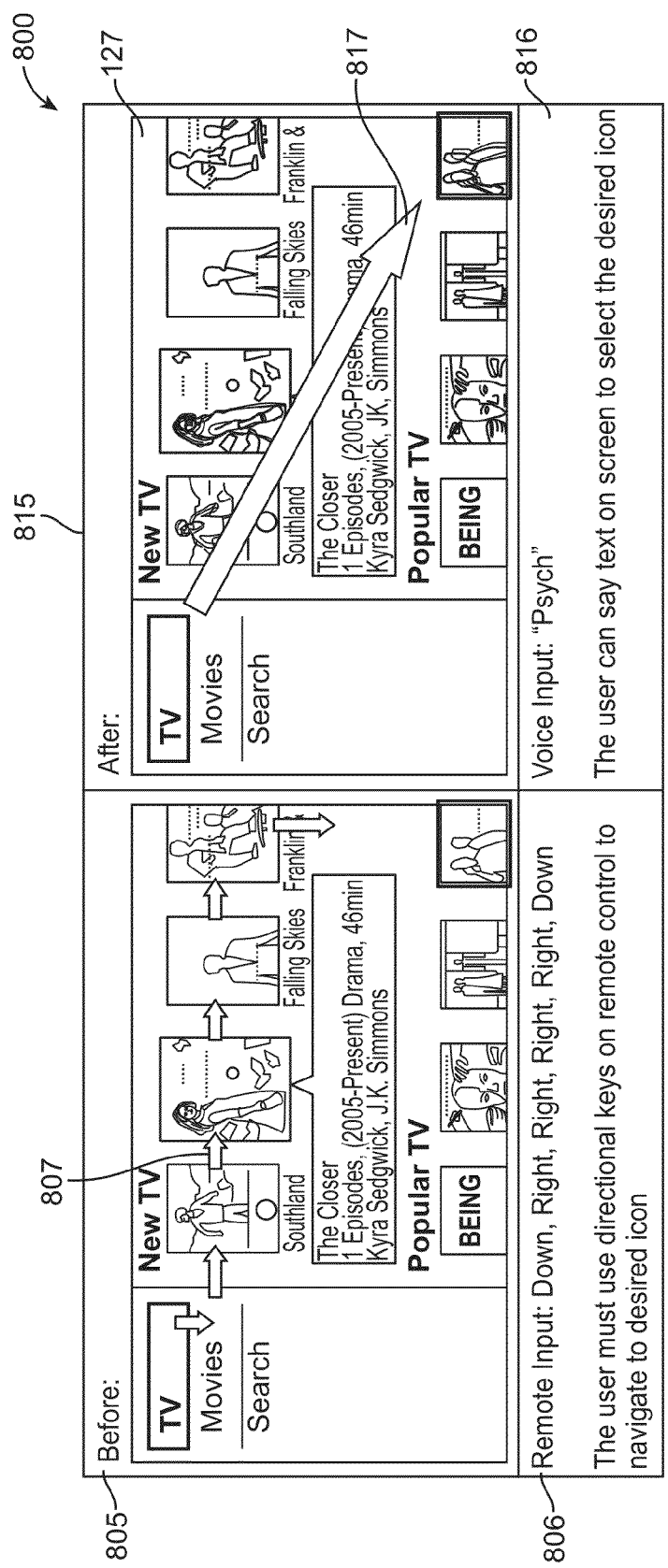
FIG. 7 shows an example scenario for a remote control usage, and a voice control usage for a navigation framework for voice controlling applications on an electronic device, according to an embodiment.

FIG. 7 shows an example scenario 800 for a remote control usage, and a voice control usage for a navigation framework for voice controlling applications on an electronic device 120, according to an embodiment. Prior to using the navigation framework module 135, an example application 805 running on an electronic device uses remote control inputs 806 to enter linear control of the application 805. The remote control inputs 806 for navigating the application 805 in this example may include button presses 807 for Down, Right, Right, Right, Right, Down to select a desired icon. In one embodiment, an example 815 shows that after the navigation framework module 135 has processed an application (e.g., application 1 127), a voice input 816 of "Psych" directly results in the action 817 for selecting a desired icon.

Figure 8:
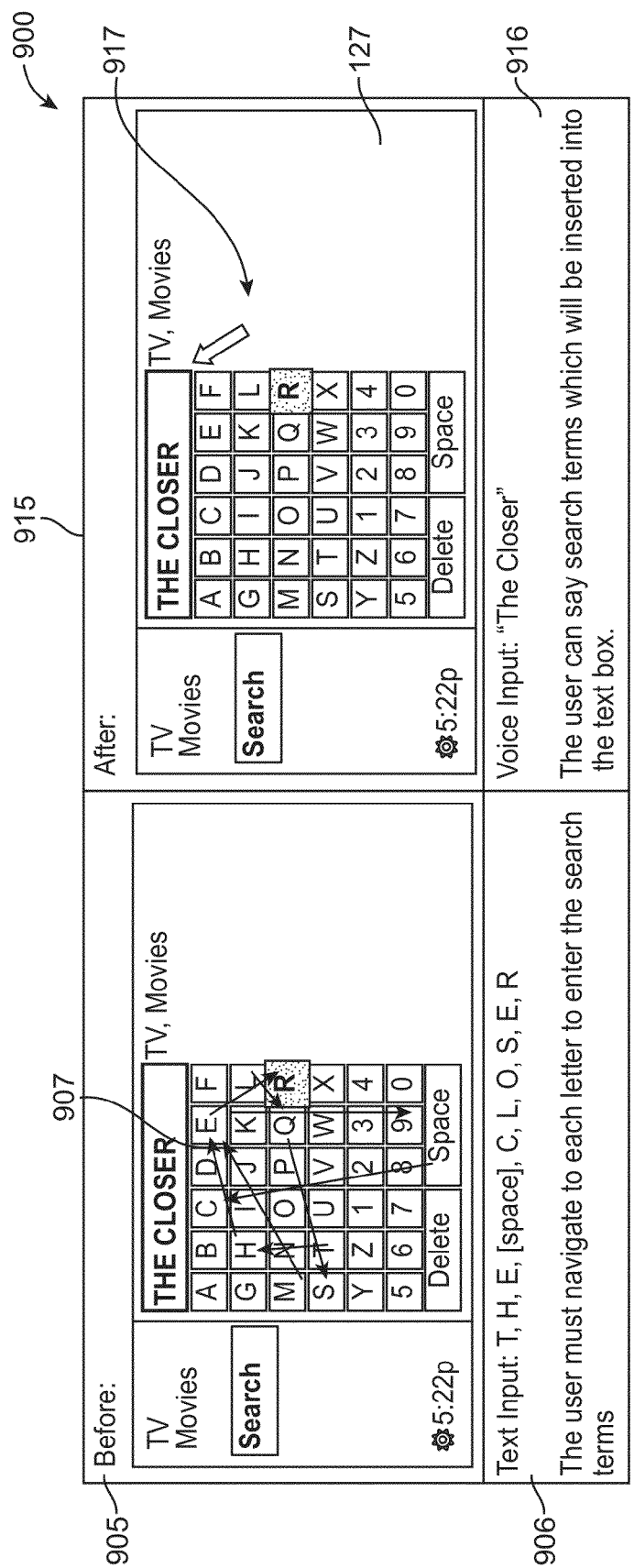
FIG. 8 shows another example scenario for a remote control usage, and a voice control usage for a navigation framework for voice controlling applications on an electronic device, according to an embodiment.

FIG. 8 shows another example scenario 900 for a remote control usage, and a voice control usage for a navigation framework for voice controlling applications on an electronic device 120, according to an embodiment. Prior to using the navigation framework module 135, an example search string application 905 running on an electronic device uses remote control inputs 906 using navigation entries 907 to enter linear control of the application 905. The remote control inputs 906 for navigating the application 905 in this example may include navigation 907 to result in entering the letters T, H, E, [space], C, L, O, S, E, R to enter a desired search term "THE CLOSER." In one embodiment, an example 915 shows that after the navigation framework module 135 has processed an application (e.g., application 1 127), a voice input 916 of "The Closer" directly results in the action 917 for entering the desired search terms.

FIG. 9 shows an example multi-dimensional data structure 1000 of command pairs organized into sets (e.g., 1010, 1020, 1030, and 1040) for a navigation framework for voice controlling applications on an electronic device 120, according to an embodiment. In one embodiment, the command registration module 310 stores command/callback pairs in the multi-dimensional data structure 1000. In one embodiment, new command/callback pairs may be dynamically added as the UI shifts between different scenes of an application. In one embodiment, the command pairs are organized into sets, such as sets 1010, 1020, 1030 and 1040, where each set is associated with a set name 1050. In one embodiment, the multi-dimensional data structure includes columns for set name 1050, command 1060, callback 1070, command type 1080 (e.g., static or dynamic), and optional notes 1090. In one embodiment, the sets represent logical partitions of the UI, such as menu items, content icons, etc. In one embodiment, the sets may represent sets of abstract commands, such as remote control inputs. In one embodiment, sets may be enabled and disabled by a developer to control usage as a user navigates through the UI of an application.

In one embodiment, the commands 1060 are also categorized by type 1080 as "static" or "dynamic" commands. In one embodiment, the static commands are fixed strings and use the electronic device's embedded ASR for highly accurate matching. In one embodiment, dynamic commands are matched to cloud or server side free speech voice recognition results, and may be less accurate than using the electronic device's ASR, but are more flexible.

FIG. 10 shows an example table 1100 of Regex matching for a navigation framework for voice controlling applications on an electronic device 120, according to an embodiment. In one embodiment, dynamic type commands use a regular expression syntax to provide developers additional flexibility. In one embodiment, dynamic commands are processed by a regular expression matching engine of the Regex routing module 321 (FIG. 3). In one embodiment, one advantage of using dynamic commands includes substring matching, for example, match any string that contains the sub-string "comedy." In one embodiment, another advantage of using dynamic commands includes variable identification, for example, find the sub-string "search" and pass any text after that as a [title] variable to a callback function. Some examples of Regex sample matches 1120 for Regex commands 1110 are shown in table 1100.

FIG. 11 shows an example table 1200 of phonetic matching for a navigation framework for voice controlling applications on an electronic device 120, according to an embodiment. In the example table 1200, input strings 1110 are grouped in sets 1250, 1260 and 1270. Example phonetic strings 1220 are shown with matching strings 1230. In one embodiment, the phonetic matching module 360 supports the Regex routing module 321 with fuzzy matching. In one embodiment, phonetic translation algorithms of the phonetic matching module 360 searches for common linguistic patterns and condenses normal strings into phonetic equivalents, which may be compared to the phonetic equivalent of user registered commands. Table 1200 shows examples where normal Regex matching would fail, but phonetic matching using the phonetic matching module 360 are successful.

FIG. 12 shows an example 1300 showing remote control emulation for a navigation framework for voice controlling applications on an electronic device 120, according to an embodiment. Some applications already include code to handle input from remote control devices. For applications that already include code for handling input from remote control devices, in one embodiment, the voice navigation framework module 135 hooks into the existing implementation by triggering key events when a matching voice command is detected. In one embodiment, a direct one-to-one translation of voice command to remote control buttons is provided. Other applications may not provide code to handle remote control device input. For these applications, in one embodiment the remote control emulation module 340 implements directional events (e.g., up, down, left, right) to allow use with the remote control and the voice equivalents.

In one embodiment, as the user navigates through a page of an application, the next item to be selected is calculated dynamically using the coordinates of the current item and all selectable items on the screen. In one embodiment, the coordinates of icons 1310 represent an application page. In one embodiment, from the upper left hand corner of the currently selected element, the distance between the upper left hand corner of each other selectable element is calculated. In one embodiment, the search is restricted to only those objects falling within a cone 1320 expanding in each direction; the shape of the cone is narrow to favor elements that are well aligned with the current object. In one embodiment, from those items that fall into the cones, the object with the shortest distance is selected when that direction is pressed.

FIG. 13 shows an example 1420 showing automated command registration via DOM analysis via the DOM analysis module 330 for a navigation framework for voice controlling applications on an electronic device 120, according to an embodiment. In one embodiment, the DOM analysis module 330 analyzes a web application for commands and callback functions, and registers the commands and callback functions automatically into the command registration module 310. In the example 420, a developer may specify HTML attributes 1410 that are searched during the analysis, using a custom attribute, such as "voice" or an existing attribute, such as "id."

In one embodiment, the command registration module 310 searches for these attributes using jQuery and registers the respective callbacks into the in the command registration module 310. In one example, the registration comprises entering the commands 1425 and callbacks 1426 into a table, a database, a dictionary. etc. The example 1420 shows developer code 1410 using the "id" attribute to register command callback pairs.

Figure 14:
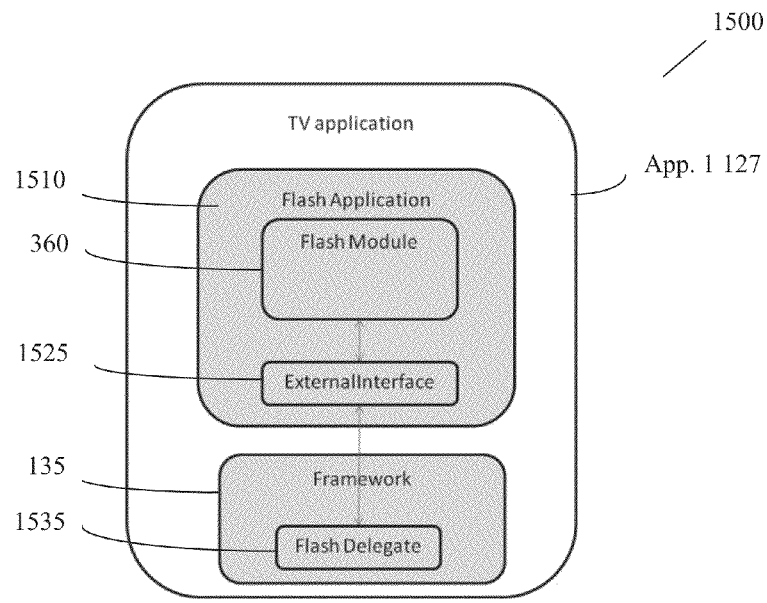
FIG. 14 shows an example flash adapter module for a navigation framework for voice controlling applications on an electronic device, according to an embodiment.

FIG. 14 shows an example 1500 of the flash adapter module 360 coupled with a flash application 1510 and a television application 1 127 for a navigation framework for voice controlling applications on an electronic device 120, according to an embodiment. In one embodiment, the flash application 1510 includes an ExternalInterface API 1525 that couples with the voice navigation framework module 135 that includes a flash delegate 1535. In one embodiment, the ExternalInterface API 1525 communicates between the flash module 360 and the flash delegate 1535.

In one embodiment, the after making a single line actionscript call, the flash module 360 injects the voice navigation framework module 135 processing through the ExternalInterface API 1525 provided by the flash player. In one embodiment, to allow the two sides to interoperate, the flash module 360 injects additional javascript that searches for the flash object in the flash application 1510 page and registers the corresponding actionscript callbacks.

Figure 15:
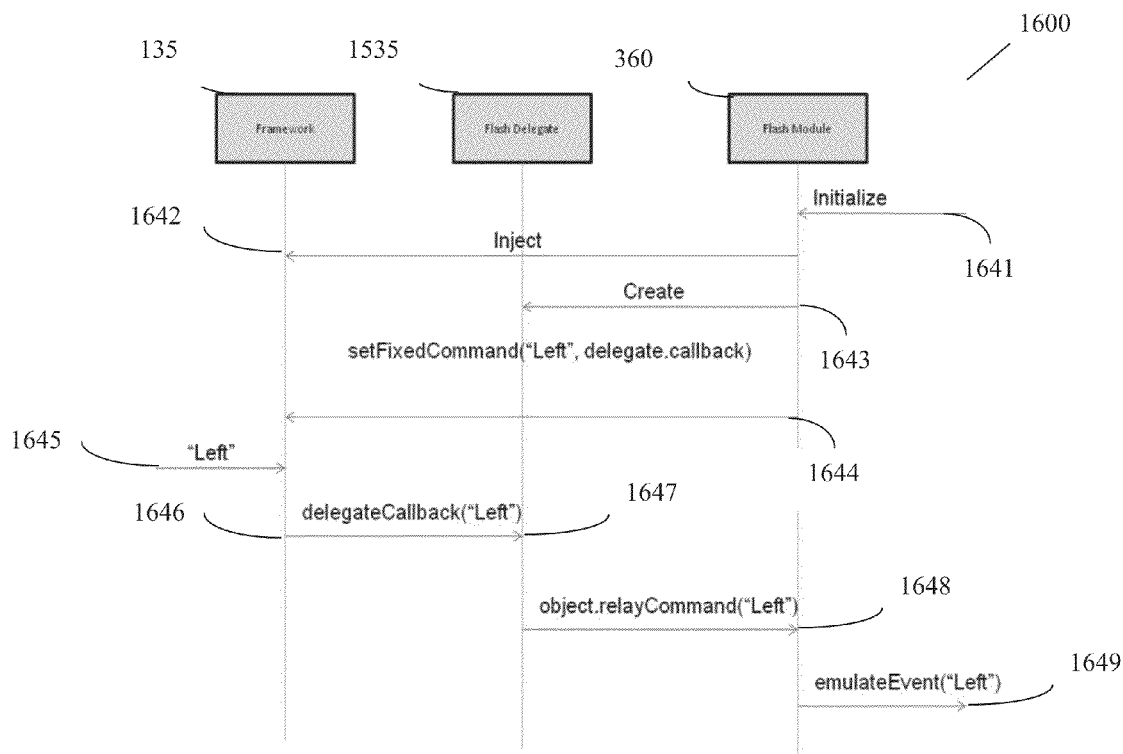
FIG. 15 is an example flow for a flash module for a navigation framework for voice controlling applications on an electronic device, according to an embodiment.

FIG. 15 is an example flow 1600 for the flash module 360 used with a flash application (e.g., flash application 1510) for a navigation framework for voice controlling applications on an electronic device 120, according to an embodiment. In one embodiment, after initialization 1641, the voice navigation framework module 135 is able to handle any voice input and relay remote commands ("Up", "Down", "Play", "Enter", etc.) into flash. In one embodiment, once received, the actionscript side translates the command into their corresponding native actionscript keyboard events. This in turn allows the developer to leverage their existing application logic while enabling voice commands. In one embodiment, the flash module 360 also allows actionscript developers to leverage the command registration capabilities of the voice navigation framework 135 by exposing a similar interface through the actionscript library.

In one embodiment, when the flash module 360 is invoked, the flash module 360 may also perform Stage Analysis (analogous to DOM Analysis) to automatically register text strings that are placed onto the actionscript stage. In one embodiment, translating spoken strings into bubbled mouse events allows flash applications that were not designed for an electronic device's directional remote input to be easily navigable through voice commands. The example 1600 shows the example stages for interoperability between the voice navigation framework module 135, flash delegate 1535 and flash module 360. In one embodiment, the example stages comprise initialization 1641, injection 1642, creation 1643, callback entry 1644 (e.g., setFixedComand ("Left," delegate-.callback), command entry 1645 (e.g., "Left"), delegate callback using the command "left" 1647 (e.g., delegateCallback ("Left"), the object.relayCommand ("left") 1648, and emulateEvent ("Left") 1649.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to the embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A system for voice control of applications, comprising:
a voice navigation processor configured to analyze an application and determines application type and enabled features;
a command registration processor configured to register commands based on the determined application type and enabled features, and to implement directional events and voice equivalents for the directional events for emulation of remote control button presses with speech command mapping, wherein the commands control the application when matched with associated speech; and
a speech command interpretation processor configured to receive text words representing a converted speech signal of a user, to detect a speech mode for matching commands with interpreted speech, and to execute matched commands for navigation through and control of the application.

2. The system of claim 1, wherein the application type comprises at least one of a flash application type, a web application type, or an included dependencies application type.

3. The system of claim 1, wherein the enabled features comprise custom commands, remote control commands, clickable object commands, and gesture commands.

4. The system of claim 3, wherein the command registration processor is configured to emulate remote control button presses with speech command mapping by providing directional controls for remote control type applications.

5. The system of claim 4, wherein directional controls are provided for a remote control type application using a document object model (DOM) analysis.

6. The system of claim 5, wherein the command registration processor is configured to register application specified voice command and function callback pairs to control the application and navigating within the application.

7. The system of claim 6, wherein the command registration processor is configured to analyze a web type application to detect application control objects, and to register the application control objects into a voice navigation dictionary, and new pages of the web type application are automatically analyzed and new control objects are automatically registered into the voice navigation dictionary.

8. The system of claim 6, wherein the speech mode comprises at least one of a first mode for speech classified as a static command or a second mode for speech classified as a dynamic command.

9. The system of claim 8, wherein static commands comprise fixed strings and are matched using a speech recognition engine, and dynamic commands comprise expression syntax and are matched to free speech recognition results obtained over a network.

10. The system of claim 9, wherein the speech command interpretation processor is configured to provide phonetic matching of received text words with commands to navigate through and control the application.

11. The system of claim 1, wherein selectable items for an application displayed on a display device are calculated dynamically using coordinates of a current item and all selectable items displayed on the display device.

12. The system of claim 11, further comprising a flash adapter configured to search for a flash object in application pages and to register corresponding callbacks used for matching voice input with commands for a flash application.

13. The system of claim 1, wherein the system comprises a television device.

14. A method for voice control of applications, comprising:
analyzing an application, using an electronic device, for detecting application type and enabled features;
implementing directional events and voice equivalents for the directional events for emulating remote control button presses with speech command mapping;
registering commands based on the detected application type and enabled features, wherein the commands control the application when matched with associated speech;
receiving text words converted from speech received by a microphone and detecting a speech mode for matching commands with interpreted speech; and
executing matched commands for navigating through and controlling the application.

15. The method of claim 14, wherein the application type comprises at least one of a flash application type, a web application type, or an included dependencies application type, and the enabled features comprise custom commands, remote control commands, clickable object commands, and gesture commands.

16. The method of claim 15, further comprising:
emulating remote control button presses with speech command mapping by providing directional controls for remote control type applications; and
searching for flash objects in application pages and registering corresponding callbacks for matching voice input with commands for a flash application.

17. The method of claim 16, wherein providing directional controls comprises using a document object model (DOM) analysis.

18. The method of claim 17, further comprising:
registering application specified voice command and function callback pairs into a voice navigation dictionary for controlling the application and navigating within the application;
analyzing a web type application for detecting application control objects; and
registering the application control objects into the voice navigation dictionary, wherein new pages of the web type application are automatically analyzed and new control objects are automatically registered into the voice navigation dictionary.

19. The method of claim 18, wherein the speech mode comprises at least one of a first mode for speech classified as a static command or a second mode for speech classified as a dynamic command, and static commands comprise fixed strings, and dynamic commands comprise expression syntax.

20. The method of claim 19, further comprising:
interpreting speech commands by matching received text words phonetically with registered commands for navigating through and controlling the application.

21. The method of claim 14, wherein selectable items for an application displayed on a display device coupled to the electronic device are calculated dynamically using coordinates of a current item and all selectable items displayed on the display device.

22. A non-transitory computer-readable medium that includes a program that when executed on a computer performs a method comprising:
analyzing an application for detecting application type and enabled features;
implementing directional events and voice equivalents for the directional events for emulating remote control button presses with speech command mapping;

registering commands based on the detected application type and enabled features, wherein the commands control the application when matched with associated speech;

receiving text words converted from speech received by a microphone and detecting a speech mode for matching commands with interpreted speech; and executing matched commands for navigating through and controlling the application.

23. The non-transitory computer-readable medium of claim 22, wherein the application type comprises at least one of a flash application type, a web application type, or an included dependencies application type, and the enabled features comprise custom commands, remote control commands, clickable object commands, and gesture commands.

24. The non-transitory computer-readable medium of claim 23, further comprising:

emulating remote control button presses with speech command mapping by providing directional controls for remote control type applications; and searching for flash objects in application pages and registering corresponding callbacks for matching voice input with commands for a flash application.

25. The non-transitory computer-readable medium of claim 24, wherein providing directional controls comprises using a document object model (DOM) analysis.

26. The non-transitory computer-readable medium of claim 25, further comprising registering application specified voice command and function callback pairs for controlling the application and navigating within the application.

27. The non-transitory computer-readable medium of claim 26, further comprising:

analyzing a web type application for detecting application control objects; and registering the application control objects into a voice navigation dictionary, wherein new pages of the web type application are automatically analyzed and new control objects are automatically registered into the voice navigation dictionary.

28. The non-transitory computer-readable medium of claim 27, wherein the speech mode comprises at least one of a first mode for speech classified as a static command or a second mode for speech classified as a dynamic command, and static commands comprise fixed strings, and dynamic commands comprise expression syntax.

29. The non-transitory computer-readable medium of claim 28, further comprising:

interpreting speech commands by matching received text words phonetically with registered commands for navigating through and controlling the application.

30. The non-transitory computer-readable medium of claim 22, wherein selectable items for an application displayed on a display device of the electronic device are calculated dynamically using coordinates of a current item and all selectable items displayed on the display device.

\* \* \* \* \*